United States Patent [19]

Chan et al.

[11] Patent Number: 4,791,436

[45] Date of Patent: Dec. 13, 1988

[54] NOZZLE PLATE GEOMETRY FOR INK JET PENS AND METHOD OF MANUFACTURE

[75] Inventors: C. S. Chan; Gary E. Hanson, both of Boise, Id.

[73] Assignee: Hewlett-Packard Company, Palo Alto, Calif.

[21] Appl. No.: 121,439

[22] Filed: Nov. 17, 1987

[51] Int. Cl.[4] .................... G01D 15/18

[52] U.S. Cl. .................... 346/140 R; 204/11; 239/601

[58] Field of Search .................... 346/140, 75, 1.1; 204/11; 156/644; 239/601

[56] References Cited

U.S. PATENT DOCUMENTS 4,184,925 1/1980 Kenworthy .................... 204/11

4,694,308 9/1987 Chan .................... 346/140

*Primary Examiner*—Joseph W. Hartary

*Attorney, Agent, or Firm*—William J. Bethurum

[57] ABSTRACT

A nozzle plate suitable for use in an ink jet printer and method of manufacturing this plate, which includes forming a plurality of grooves or serrations in the interior orifice bore surfaces of the plate. These grooves or serrations may advantageously be electroformed replications of a sculptured photoresist mask used in the electroforming process, and they serve to maximize the interior surface area of the orifice bores. This feature in turn serves to maximize frequency response, wettability, fluid flow rate, damping factor and capillarity of the nozzle plate relative to these parameters of a smooth surface orifice bore.

7 Claims, 2 Drawing Sheets

NOZZLE PLATE GEOMETRY FOR INK JET PENS AND METHOD OF MANUFACTURE

TECHNICAL FIELD

This invention relates generally to ink jet printing and more particularly to the manufacture of nozzle plates for use in constructing thermal ink jet printheads.

BACKGROUND ART AND RELATED APPLICATIONS

In U.S. Pat. No. 4,694,308 issued to C. S. Chan et al, there is disclosed and claimed a new and improved nickel barrier layer and nozzle plate assembly for use in thermal ink jet printheads. In this patent, there is described a composite nozzle plate with a nickel barrier layer portion and an outer nickel orifice plate portion, and these two portions are integrally formed in a two mask step electroforming process. The nozzle plate thus formed includes convergent orifice passageways which serve to minimize gulping and cavitation wear during an ink jet printing operation.

In U.S. Pat. No. 4,675,038 issued to James G. Bearss et al, there is disclosed and claimed a new and improved compound bore fabrication process for improving the orifice center-to-center spacing density in metal nozzle plates without requiring a corresponding reduction in nozzle plate thickness. Both of these commonly assigned patents are assigned to the present assignee and are incorporated herein by reference. Additionally, the actual electroforming process chemistry for plating the layers of nickel described in these two copending applications is described in more detail in the *Hewlett-Packard Journal,* Volume 38, Number 5, May 1985, also incorporated herein by reference.

DISCLOSURE OF INVENTION

The invention described and claimed herein provides still further new and useful improvements in the manufacture of thermal ink jet nozzle plates, and to this end has as it principal object the provision of a new and improved nozzle plate geometry characterized by an improved and extended frequency response.

Another object of this invention is to provide a nozzle plate of the type described which, relative to known prior art nozzle plates, has a higher capillary restoring force, hence higher fluid refill rates and a higher dynamic response.

A further object is to provide a new and improved nozzle plate of the type described which exhibits increased wettability with respect to orifices having smooth interior surfaces.

These and other objects and advantages of this invention are achieved herein by initially forming a mask having serrated or sculptured outer surfaces on the surface of a selected substrate and then electroforming a nozzle plate on the substrate surface and having orifice openings therein with internal surface contours defined by the sculptured surface areas of the mask. Once the nozzle plate is electroformed on the substrate, the substrate may then be removed from the nozzle plate and the mask removed from the orifices in the nozzle plate to thereby leave the nozzle plate having interior sculptured orifices therein.

The present invention is also directed to the article of manufacture made by the present process and described in more detail herein with reference to the accompanying drawings.

DESCRIPTION OF A PREFERRED EMBODIMENT

Figure 1:
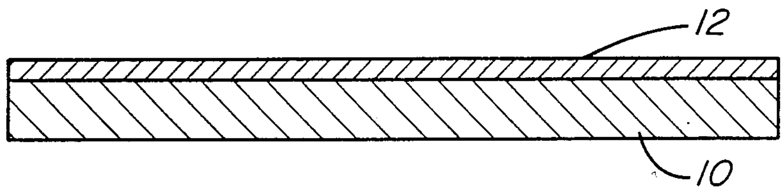
FIGS. 1–5 illustrate schematically a sequence of process steps used in fabricating a serrated or sculptured convergent nozzle plate in accordance with the present invention.

Referring now to FIG. 1, there is shown a stainless steel substrate 10 with a surface layer 12 of photoresist thereon. The structure of FIG. 1 is taken to a conventional photoresist masking and etching station where a sculptured or grooved surface pattern 14 is etched in a photoresist mask segment 16. This mask segment is only one of a larger number of mask segments (not shown) used to define a corresponding plurality of convergent orifices in an ink jet nozzle plate being manufactured.

Figure 2:
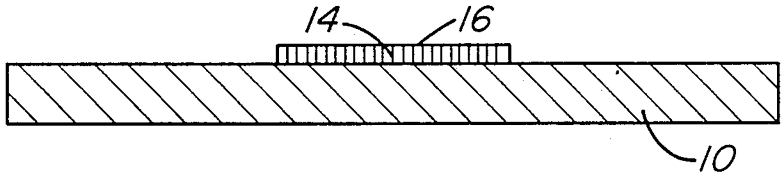
Figure 3:
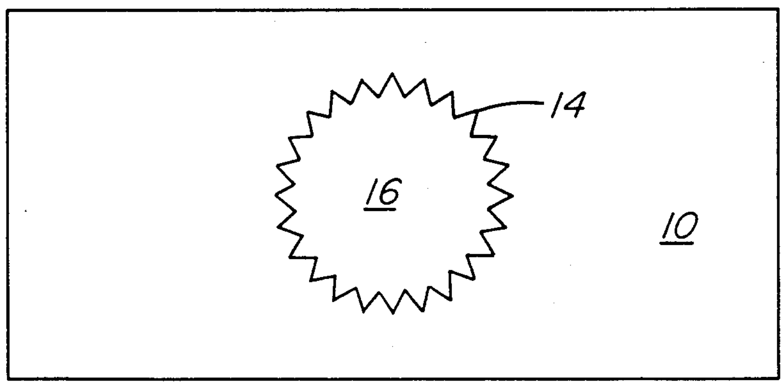

The masked structure in FIGS. 2 and 3 is transferred to an electroforming station of the type described in the above Chan et al U.S. Pat. No. 4,694,308 and the above *Hewlett-Packard Journal* and plated with a layer 18 of nickel with orifices therein having interior grooves 20 which are replicated from the grooves 14 in the mash segments 16. These grooves 20 thus define a serrated or sculptured pattern on the interior surfaces of the convergent orifices of the nozzle plate 18 as shown in FIG. 4.

Figure 4:
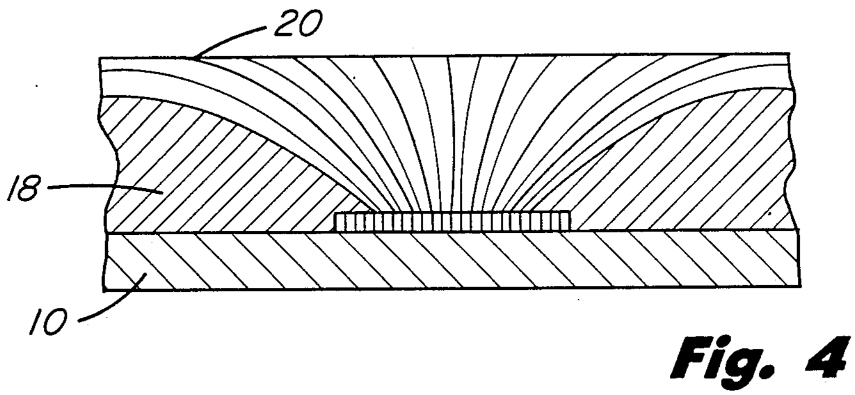
Figure 5:
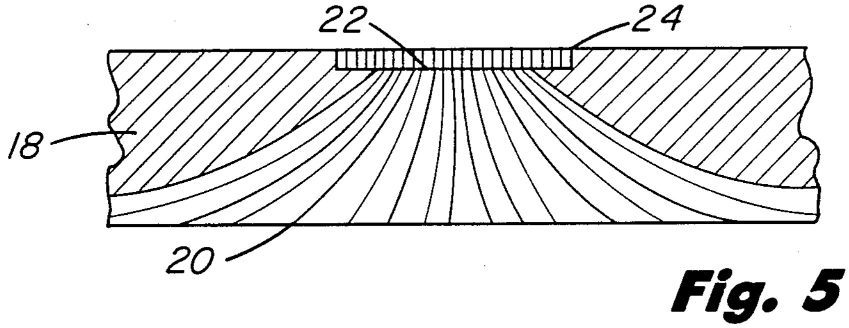

Finally the nozzle plate 18 in FIG. 4 is stripped away from the steel substrate 10, with chemical etchant applied to the photoresist mask 16 as needed, to leave the resultant nozzle plate structure shown in FIG. 5.

Figure 6:
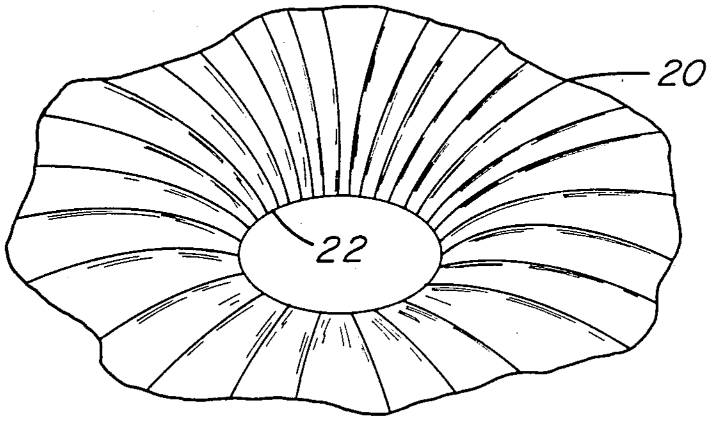
FIG. 6 is an enlarged fragmented view of the convergent interior sculptured surfaces of the nozzle plate in FIG. 5.

The serrations or grooves in the interior walls of the orifice bore are seen in greater detail in the enlarged fragmented view of FIG. 6. The center-to-center spacing of these grooves will typically be in the range of 20–25 microns, and the exit diameter 22 of the orifice opening in FIG. 6 will be about 130 microns. The pitch of the "teeth" defining and bounding the grooves 20, which is the distance from the inscribed circle with a diameter 22 to the outside edge of each tooth or serration bounding each groove, will be about 15 microns. These grooves serve to increase and optimize the surface area of the orifice bore and thereby increase its capillarity, fluid flow rate, wettability, damping factor and frequency response relative to these parameters for a smooth surface orifice bore.

Various modifications may be made in the above described embodiment without departing from the scope of this invention. For example, the present invention may be incorporated in either the composite nickel barrier layer process of the above-identified Chan et al patent or the compound bore process of the above identified Bearss et al patent. In addition, the present invention is not limited to the formation of an exit orifice with the circular geometry shown in the above described embodiment. Instead, other geometries such as rectangles and other multiple sided orifice openings may be used in combination with the serrated or sculptured orifice structure described and claimed herein.

We claim:

1. A process for manufacturing a nozzle plate for an ink jet printhead which comprises:

a. providing a selected substrate, b. forming a mask on said substrate and having a sculptured or grooved outer surface area thereon, c. forming a nozzle plate on said substrate and having orifice bore surfaces therein defined by the sculptured or grooved surface area of said mask, and d. removing said nozzle plate from said substrate to thereby leave sculptured interior orifice bore surfaces in said nozzle plate.

2. The process defined in claim 1 wherein said nozzle plate is electroformed on said substrate.

3. The process defined in claim 2 wherein said nozzle plate is electroformed of nickel on a stainless steel substrate, and said mask is a sculptured photoresist mask formed on said stainless steel substrate.

4. A process for manufacturing a nozzle plate used for ejecting a liquid through a plurality of orifices therein, characterized by forming for each orifice a sculptured convergent interior orifice surface pattern to thereby maximize the interior orifice surface area thereof.

5. A nozzle plate having a plurality of convergent orifices therein for ejecting ink onto a print medium, and a plurality of grooves in the interior contoured surface areas of said convergent orifices, with said grooves forming a sculptured interior orifice surface pattern and thereby maximizing the total interior surface area of said orifices, whereby the frequency response, wettability, damping factor, capillarity and fluid flow rate of said nozzle plate are optimized.

6. The nozzle plate defined in claim 5 wherein said nozzle plate is electroformed of nickel.

7. A nozzle plate useful for ejecting a liquid through a plurality of orifices therein, characterized in that each of said orifices includes a sculptured convergent interior orifice surface pattern which tends to maximize the interior surface area of each orifice and thereby in turn optimizes fluid ejection flow rate and freqeency response of said nozzle plate.

* * * * *

UNITED STATES PATENT AND TRADEMARK OFFICE
CERTIFICATE OF CORRECTION

PATENT NO. : 4,791,436

DATED : December 13, 1988

INVENTOR(S) : C.S. Chan and Gary E. Hanson

It is certified that error appears in the above-identified patent and that said Letters Patent is hereby corrected as shown below:

Column 1, line 24, "4,675,038" should read -- 4,675,083 --.

Column 4, line 19, "freqeency" should read -- frequency --.

Signed and Sealed this

Fifteenth Day of August, 1989

*Attest:*

DONALD J. QUIGG

*Attesting Officer* *Commissioner of Patents and Trademarks*